(12) United States Patent
Simhaee

(10) Patent No.: US 6,279,300 B1
(45) Date of Patent: Aug. 28, 2001

(54) METHOD OF MANUFACTURING AIR CELL DUNNAGE

(76) Inventor: Ebrahim Simhaee, 112 N. Maple Dr., Beverly Hills, CA (US) 90210

(*) Notice: Subject to any disclaimer, the term of this patent is extended or adjusted under 35 U.S.C. 154(b) by 0 days.

(21) Appl. No.: 09/250,361

(22) Filed: Feb. 12, 1999

(51) Int. Cl.$^7$ ...................................................... B65B 47/00
(52) U.S. Cl. .................................. 53/453; 53/559; 53/567
(58) Field of Search ........................... 53/453, 561, 559; 206/522; 264/514, 510; 156/147, 145; 428/166, 178, 198, 158, 72, 69; 493/967

(56) References Cited

U.S. PATENT DOCUMENTS

| | | |
|---|---|---|
| 2,633,422 | 3/1953 | Caldwell . |
| 3,011,930 | 12/1961 | Dworak . |
| 3,098,563 | 7/1963 | Skees . |
| 3,219,514 | 11/1965 | de Roysancour . |
| 3,523,055 | 8/1970 | Lemelson . |
| 3,636,566 | 1/1972 | Sutherland . |
| 3,640,831 | 2/1972 | Gardner et al. . |
| 3,660,189 | 5/1972 | Troy ....................................... 156/145 |
| 3,881,491 | 5/1975 | Whyte ................................... 128/287 |
| 4,143,195 | 3/1979 | Rasmussen ............................ 428/116 |
| 4,287,250 | 9/1981 | Rudy ..................................... 428/166 |
| 4,366,663 * | 1/1983 | Grebe ................................. 53/561 X |
| 4,415,398 * | 11/1983 | Ottaviano ........................... 493/967 X |
| 5,128,182 | 7/1992 | Bunker et al. ....................... 428/34.3 |
| 5,194,315 | 3/1993 | Itoh ...................................... 428/178 |
| 5,196,254 | 3/1993 | Akiyama .............................. 428/178 |
| 5,340,632 | 8/1994 | Chappuis ............................... 428/71 |
| 5,480,693 | 1/1996 | Patterson et al. .................... 428/36.7 |
| 5,665,456 | 9/1997 | Kannankeril et al. ............... 428/178 |
| 5,849,394 | 12/1998 | Bussey, III et al. ................. 428/178 |

* cited by examiner

*Primary Examiner*—Eugene Kim
(74) *Attorney, Agent, or Firm*—Darby & Darby

(57) ABSTRACT

Different ways are disclosed for manufacturing air cell dunnage in which the variation in thickness of the individual bubble walls is significantly reduced. In one embodiment, the bubbles are formed from a plastic sheet having regions which vary in thickness so that when these regions are vacuum formed into bubbles, they result in bubbles having an approximately uniform wall thickness. The sheets are extruded through a die which is shaped to profile the thickness of the sheet from side to side. Longitudinal profiling of the thickness is provided by means of shaping bars which move vertically with respect to the extruded sheet.

The variation in wall thickness also can be reduced using flat plastic sheet by controlling the application of the vacuum to the hemispherical dies which form the bubbles. The vacuum may be applied progressively through rings of apertures from the bottom or opening of the bubble to the top or apex of the bubble. Alternatively, the suction applied to the various rings of apertures in the hemispherical dies can be varied, with greater suction applied at the base and less suction at the top, again for the purpose of increasing stretching at the base and reducing it at the top.

20 Claims, 7 Drawing Sheets

FIG. 4
FIG. 6C
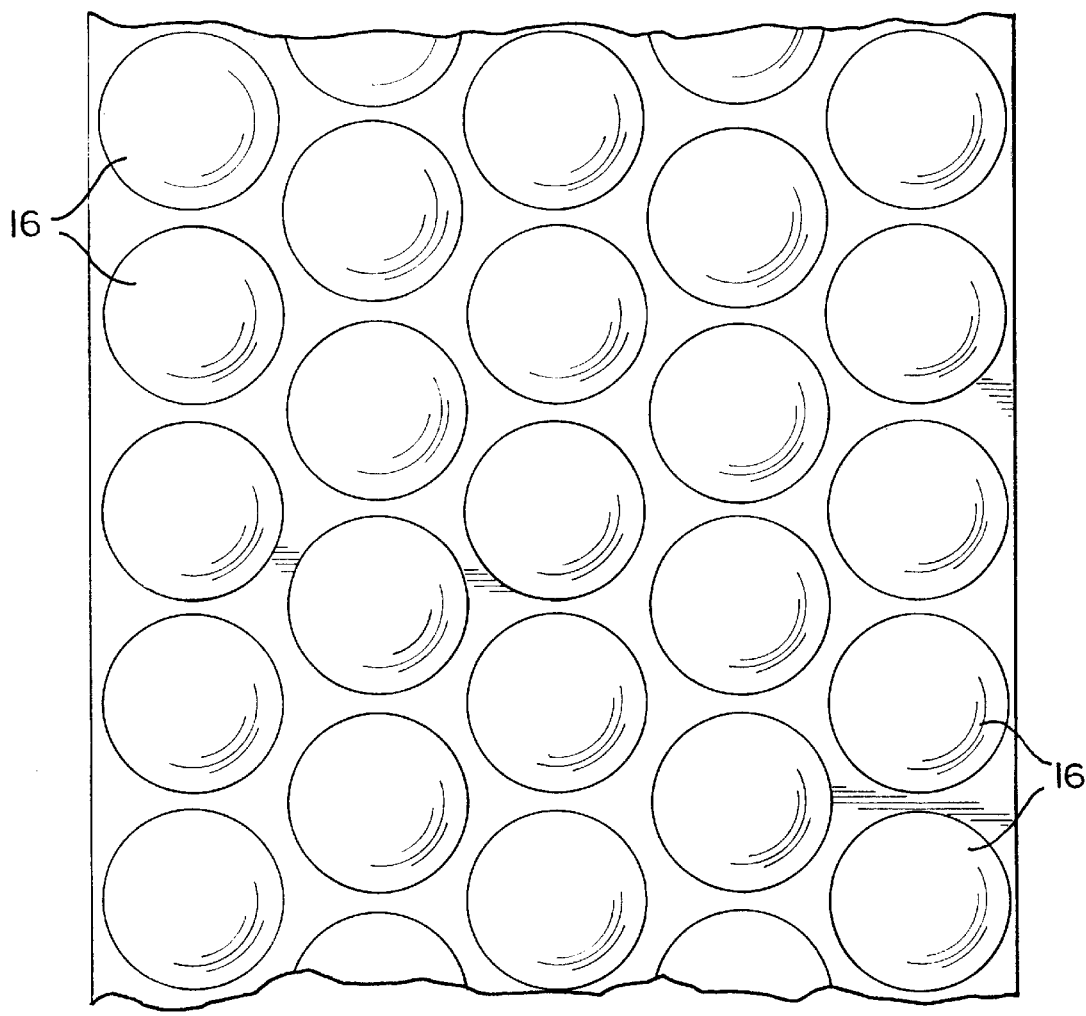
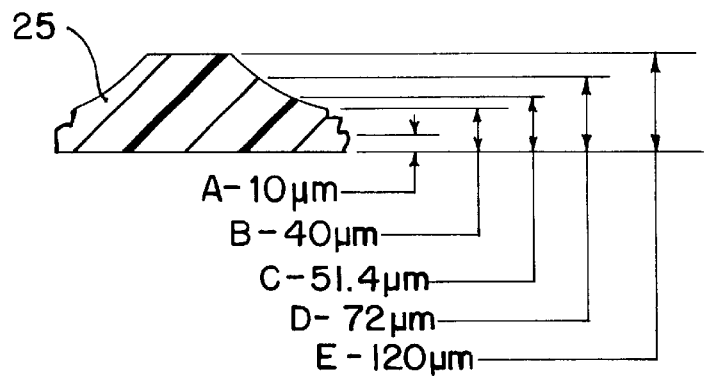

METHOD OF MANUFACTURING AIR CELL DUNNAGE

BACKGROUND

1. Field of the Invention

The present invention relates generally to packaging and, more particularly, to new methods of forming an air cell bubble sheet or dunnage for cushioning objects to be transported to prevent impact or shock damage.

2. Description of the Prior Art

It is known in the art to protect items to be shipped from damage with layered sheet-like bubble wrap. A typical prior art air cell dunnage is formed as a multiple layer assembly, which includes a thin, flat base layer and an overlying bubble layer. The bubble layer is formed from a flat plastic sheet having a thickness greater than the base layer. In the instance of relatively large bubbles, e.g., one inch diameter, the thickness ratio of the bubble sheet relative to the base layer is about 2:1. For smaller bubble diameters, e.g., 5/16", this ratio decreases to about 3:2. The bubble layer is fabricated by vacuum forming the flat plastic sheet using hemispherical female dies. This bubble layer is fused to the base layer, to form a laminate having a number of airtight cells for supporting or cushioning packaged items.

One problem associated with conventional sheets is the uneven bubble wall thickness after vacuum forming. This condition is exacerbated with large bubble diameters. The larger the bubble diameter, the greater the distance between the apex of the bubble and the base. The vacuum forming process causes the plastic to stretch from the base toward the apex of each bubble, and results in a relatively thinner wall thickness in the apical region. Consequently, after the sheet is drawn down, the final bubble sheet thickness may be too thin near the bubble apex to provide the required structural integrity. To ensure that an adequate wall thickness remains in the apical region of the bubbles after forming, the initial wall thickness of the bubble sheet must be greater than twice the thickness of the base layer.

To protect an object for shipping, a carrier or consumer snugly wraps a conventional bubble sheet around the object with the bubbles pressed between the object and the interior surfaces of a box. The bubbles provide an air cushion around the object, which suspends and protects it from shock induced damage if the box is dropped or subjected to impact.

To ensure an adequate bubble wall thickness in the final product, it is necessary to use more material than required. This is an inefficient way to manufacture the air cell dunnage and a waste of material resources.

Although conventional dual layered bubble sheet designs work as intended, a single bubble wrap as a buffer may not adequately protect the object if some of the bubbles adjacent to the packed object are caused to prematurely burst. To provide adequate anti-shock protection, commercial carriers therefore may wrap the object several times with conventional bubble sheets. This arrangement provides at least one backup bubble layer to protect the object if some of the bubbles become damaged. However, wrapping the object in multiple layers of bubble material, or having to stuff unoccupied areas of the container with "filler" material is a waste of plastic. Ultimately, higher costs are passed on to consumers, and a negative environmental impact results as more plastic material is discarded.

It is an object of the invention to provide improved air cell dunnage for protecting packed items during shipping.

It is another object of the present invention to provide air cell dunnage which can be manufactured with reduced raw material costs.

It is a further object of the present invention to provide air cell dunnage which reduces detrimental effects of material waste on the environment.

It is yet another object of the present invention to provide air cell dunnage for protecting packed items during shipping, with reduced material requirements.

It is still another object of the present invention to provide air cell dunnage which maximizes structural integrity through a molding process which minimizes material thickness disparities.

SUMMARY OF THE INVENTION

The invention provides a number of different ways of manufacturing air cell dunnage in which the variation in the thickness of the bubble wall is significantly reduced. In one embodiment, the bubbles are formed from a plastic sheet having regions which vary in thickness so that when these regions are vacuum formed into bubbles, they result in bubbles having an approximately uniform wall thickness. The sheets may be formed by extrusion through a die which is shaped to profile the thickness of the sheet from side to side. Further profiling of the thickness can be provided by means of shaping bars which move vertically with respect to the extruded sheet to vary the thickness profile longitudinally.

It is also contemplated that the variation in wall thickness can be reduced using a conventional plastic sheet by controlling the application of the vacuum to the hemispherical dies which form the bubbles. In one embodiment, the vacuum is applied progressively through rings of apertures from the bottom or opening of the bubble to the top or apex of the bubble. This increases stretching of the plastic at the base and reduces it at the top, resulting in a more uniform wall thickness. Alternatively, the suction applied to the various rings of apertures in the hemispherical dies can be varied, with greater suction applied at the base and less suction at the top, again for the purpose of increasing stretching at the base and reducing it at the top.

In accordance with another aspect of the invention, a substantial savings in the material requirements of air cell dunnage is achieved by providing a double-sided bubble sheet. To accomplish this, two bubble layers are formed in any manner including the way described above. The two bubble layers are then joined to opposite sides of a base layer. Alternatively, each of the bubble layers may be joined to a thin base layer and the base layers laminated together to form a double-sided bubble sheet.

BRIEF DESCRIPTION OF THE DRAWINGS

FIG. 4 is a partial plan view of a preferred embodiment of an air cell dunnage assembly in accordance with one aspect of the invention;

FIG. 6C is a cross-sectional area of one of the profiled regions from which a bubble is shown showing the thicknesses of various areas for a representative example;

DETAILED DESCRIPTION OF THE PREFERRED EMBODIMENTS

As used herein, the term "bubble layer" refers to a plastic sheet or film in which bubbles have been formed (for example, by vacuum forming). The "base layer" is the plastic sheet to which the bubble layer is joined so that air is retained within the bubbles. The combination of the bubble layer and base layer is referred to as a "bubble sheet" which is also sometimes referred to as "air cell dunnage." The term "longitudinally" refers to a measurement in the direction of movement of the plastic film as it is extruded; the term "side to side" refers to the transverse dimension, i.e. the width of the extruded film.

Figure 1:
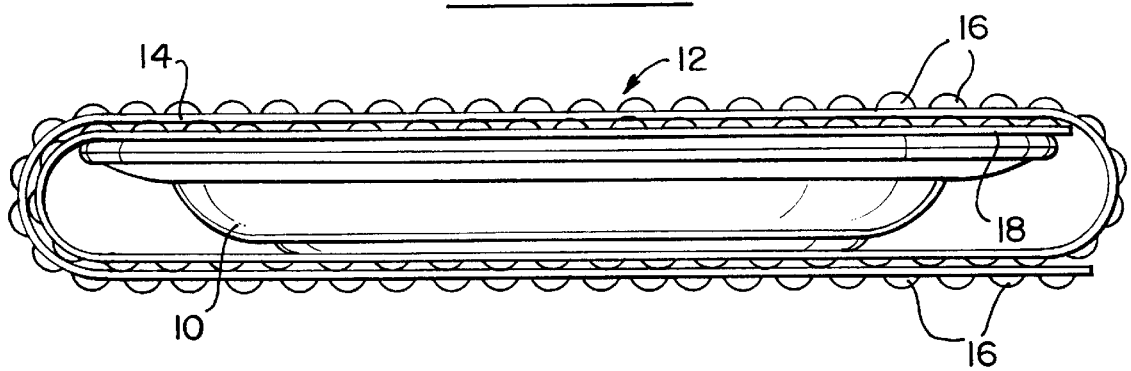
FIG. 1 is an end view of an object wrapped with a conventional bubble wrap.

Referring now to FIG. 1, there is depicted a conventional bubble sheet 12 wrapped around an object 10 to be shipped. As discussed above, a bubble sheet 12 is typically wrapped around the object a number of times to provide the requisite degree of anti-shock protection in the event some of the bubbles are ruptured.

The bubble sheet 12 comprises a bubble layer 14 having a multiplicity of bubbles 16. The bubble layer 14 is adhered to a plastic base layer 18 by fusing the sheets together at high temperature. In this way, the flat regions between the individual bubbles 16 function as a seal to capture the air within the individual bubbles or cells.

Figure 2:
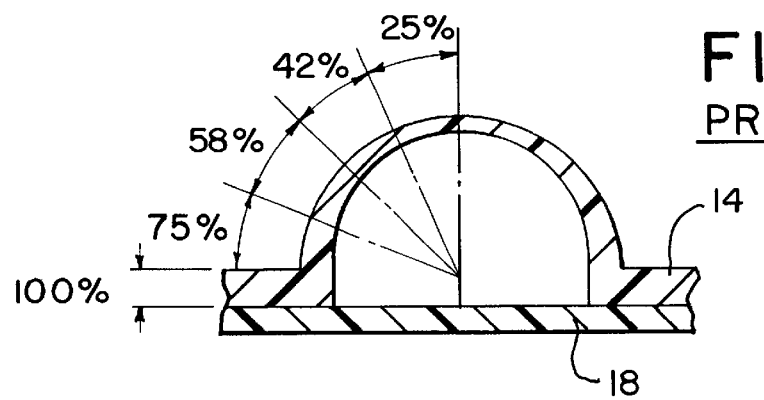
FIG. 2 is a schematic view of the bubble layer wall thickness expressed as a percentage of the starting sheet thickness in a prior art bubble sheet.
Figure 3:
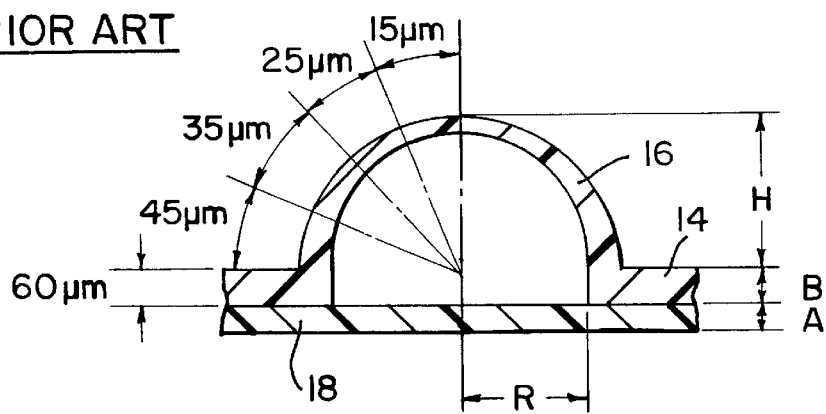
FIG. 3 is a schematic view of the absolute bubble layer wall thickness in different segments of the bubble of a prior art bubble sheet.

As shown in FIGS. 2 and 3, the distribution of plastic in the bubble layer 14 is unequal because the plastic material stretches during the vacuum forming process in which the bubbles are formed. In a bubble sheet where the diameter of the bubble is greater than two centimeters, the first 25% of the bubble wall proximate to the opening of the bubble has an average thickness of about 75% of the sheet from which the bubble was formed. The next 25% of the wall has an average thickness equal to about 58% of the sheet, since this section tends to stretch more due to the greater travel distance. The next 25% has an average thickness equal to about 42% of the base layer, and the last 25%, proximate to the top or apex of the bubble has an average thickness equal to about 25% of the sheet. FIG. 3 depicts the bubble wall thicknesses for the respective segments assuming the thickness of the sheet from which the bubble was formed to be 60 µm.

FIG. 3 and the following table show the relationship between bubble parameters for representative examples of a prior art bubble sheet:

| Bubble Height or Bubble Radius R (inches) | Bubble Base Diameter 2R (inches) | Bubble Base Area $\pi R^2$ (square inches) | Bubble Dome Area $2\rho R^2$ square inches) | Total Thickness of Base and Bubble Layers A + B (µm) |
|---|---|---|---|---|
| 0.15625 | 0.3125 | 0.0767 | 0.1534 | 55 |
| 0.1875 | 0.3750 | 0.1104 | 0.2208 | 55 |
| 0.5000 | 1.0000 | 0.7850 | 1.5700 | 82 |
| 0.59375 | 1.1875 | 1.1070 | 2.2140 | 99 |

The present invention provides various methods of manufacturing a bubble layer having almost uniform bubble wall thickness after vacuum forming. This reduces the amount of plastic material required, ensures a uniform bubble structure which exhibits greater resistance to impact, and reduces the need to double wrap objects to be protected. The plastic sheet may comprise a flexible thermoplastic polymer such as, polyethylene, polypropylene, polystyrene, ethylene vinyl acetate, polybutadiene-styrene, polyamide or the like.

FIG. 4 shows the positions of the bubbles 16 on a bubble layer sheet. In accordance with one embodiment of the invention, a plastic sheet is extruded and shaped with a thickness profile such that when the sheet is vacuum formed to produce the bubble layer, the wall thickness of the bubbles is approximately uniform.

Referring to FIGS. 2 and 3, it is recalled that if a film of uniform thickness is vacuum-formed to form a bubble, the peripheral base portion of the bubble is substantially thicker than its top or apex. In the representative example of FIG. 2, the thickness of the peripheral base portion is approximately three times the thickness of the apex. Ideally then, to provide uniform bubble wall thickness, the sheet prior to vacuum forming should have areas in which the centers are thicker than the peripheral regions so that after vacuum forming the thickness of the bubble wall will be approximately uniform. For example, continuing with the example of FIG. 2, if the area to be vacuum formed included a central portion which was three times as thick as the peripheral base portion, after the vacuum forming process, the two regions would be approximately equal in thickness.

Figure 5:
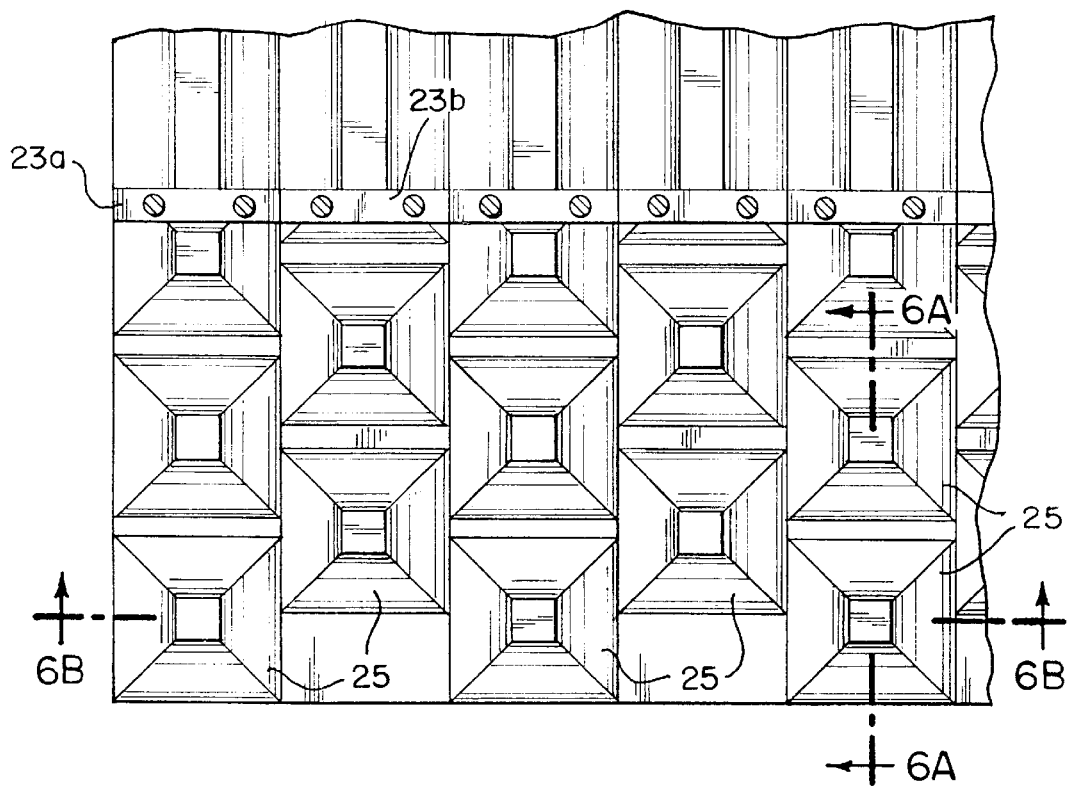
FIG. 5 is a top plan view of an extruded plastic sheet which can be used in accordance with one embodiment of the invention to produce bubble layers in which the thickness of the bubbles is approximately uniform and showing schematically the device for forming the sheet.

To provide these thickness profiles in the regions which correlate generally to the locations of the bubbles as shown in FIG. 4, it is necessary that the thickness profile of the extruded plastic film be varied both from side-to-side and longitudinally; that is, referring to FIG. 5, left to right (side-to-side) and top to bottom (longitudinally). The side-to-side variation is achieved using an extrusion dye shaped to correspond to the desired thickness profile illustrated by the bubble areas 25 in FIG. 6B. The longitudinal profile is achieved by means of two arrays of shaping bars, 23a and 23b, which move up and down with respect to the film (in and out of the plane of the paper in FIG. 5). The bars 23a operate together and the bars 23b operate together. The shaping bars produce the longitudinal profile by periodically covering portions of the openings in the die as the plastic film is extruded. FIG. 6B demonstrates the action of the shaping bars, with bars 23a in the down position, located behind the resulting bubble areas 25, and bars 23b rising up to produce new bubble areas 25. The movement of the shaping bars is coordinated with the extrusion of the film to provide the desired longitudinal profile as illustrated in FIG.

6A. By properly timing the movement of the shaping bars with respect to the extrusion, the desired side-to-side and longitudinal thickness profiles can be achieved, i.e. the plastic sheets used to form the bubble layer will include a multiplicity of bubble areas 25 corresponding to the bubbles in which the centers are the thickest portions, decreasing gradually in a predetermined manner toward the peripheries of the bubble regions so that, upon vacuum forming, the stretching of the film in the region will result in a bubble having an approximately uniform wall thickness.

The portion of the plastic sheet between the bubbles, which is not subject to stretching, can be relatively thin, for example, about 10 µm, since it will be laminated to a base layer which will provide structural integrity.

Figure 6A:
FIG. 6A is a sectional view along the line A—A of FIG. 5 showing the longitudinal thickness profile of the extruded sheet as a result of the action of the shaping bars.
Figure 6B:
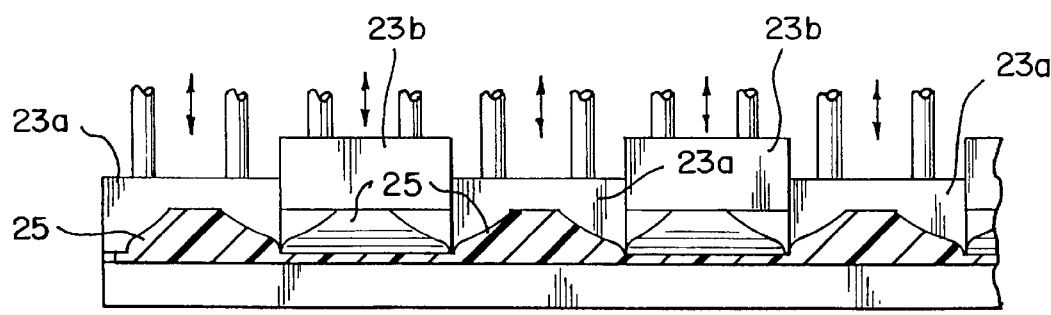
FIG. 6B is a sectional view along the line B—B of FIG. 5 showing the side to side thickness profile of the extruded plastic sheet.

In FIG. 6C representative dimensions are provided for the profiled bubble areas of a plastic sheet to be used in the production of a bubble layer in which the wall thickness of the bubble is about 30 µm, and the base diameter of the bubble is about one inch. In the exemplary embodiment, the plastic sheet is provided with a thickness profile varying from 10 µm in the regions forming the flat areas between bubbles, to a maximum of 120 µm in the central region of each cell which will form the apex of the bubble. The profile is selected so that the variability in stretching will result in uniform wall thickness. That is, for example, if the top stretches three times as much as the peripheral base portion, the portion of the bubble region 25 from which the top is formed is three times as thick as the portion from which the peripheral base portion is formed.

Figure 7:
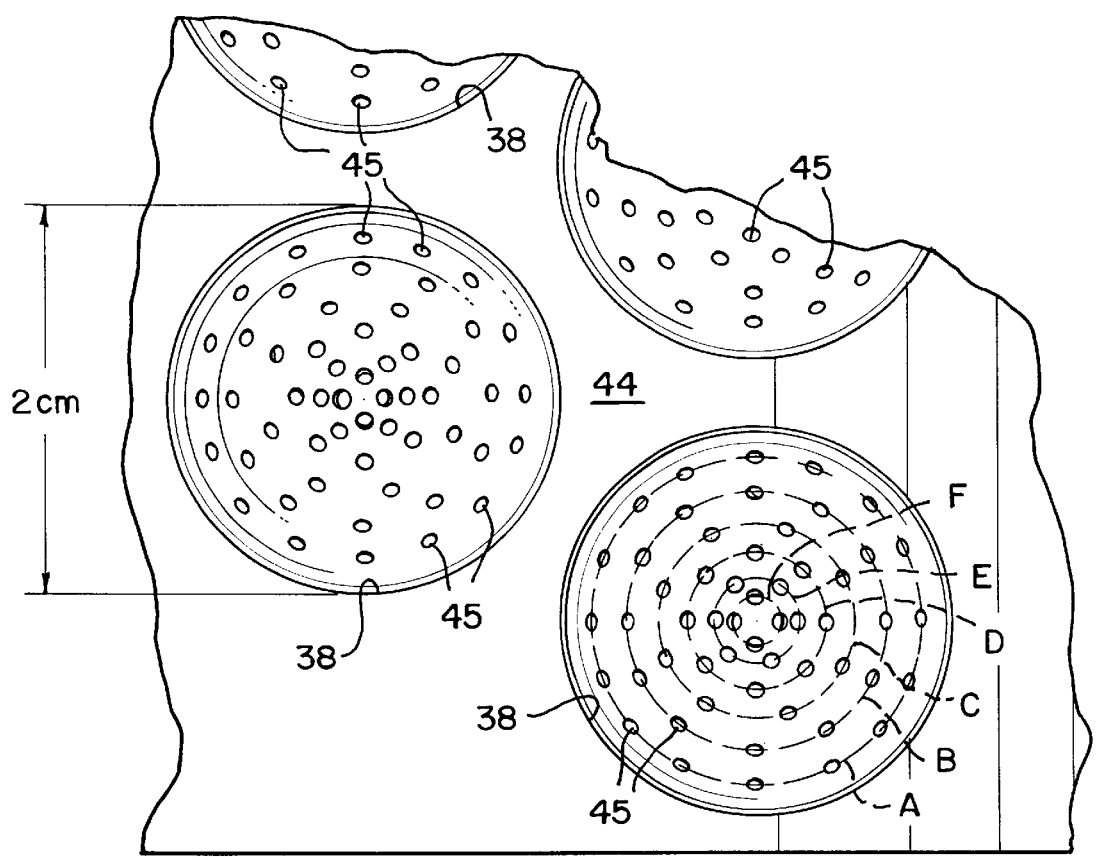
FIG. 7 is an enlarged top plan view of the hemispherical bubble forming area of a vacuum molding surface.
Figure 8:
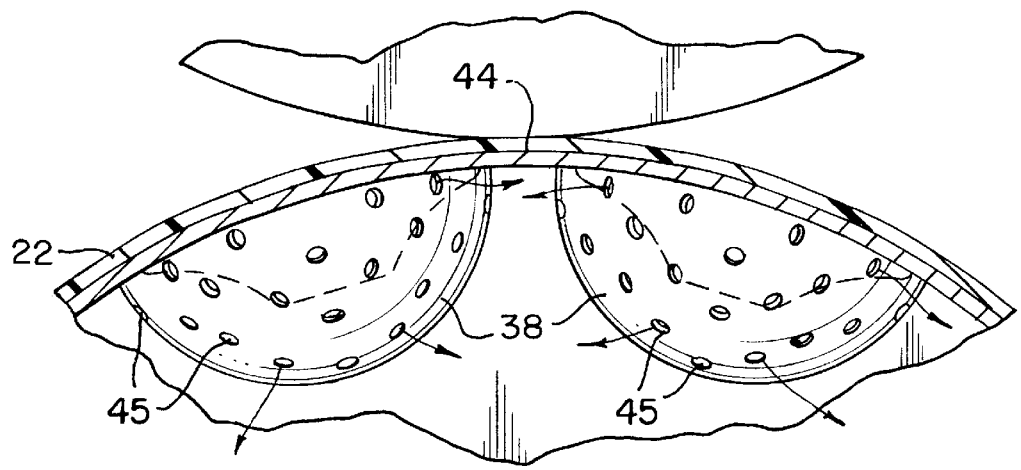
FIG. 8 is a side sectional view of the hemispherical concave bubble forming area shown in FIG. 7, showing a plastic sheet before drawing in the vacuum forming process.
Figure 9A:
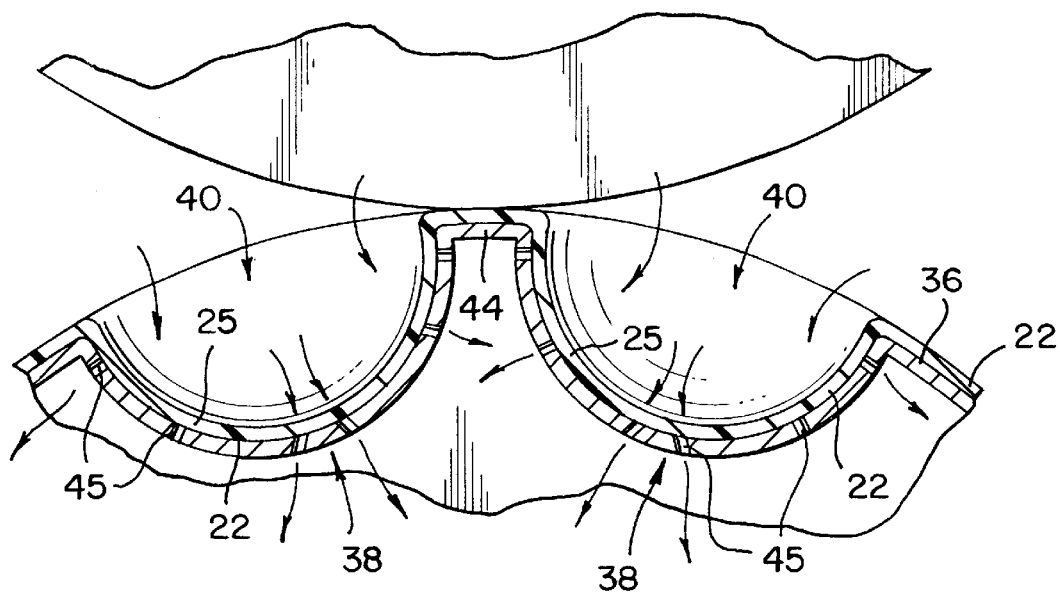
FIG. 9A is a side sectional view of the hemispherical bubble forming area shown in FIG. 7 showing a plastic sheet after being drawn in the vacuum forming process.

After the profiled sheet has been formed as described, it is vacuum formed in a conventional mold which comprises a cylinder or roller containing a multiplicity of concave bubble dies 38 (FIGS. 7 and 9A) separated by the roller surface 44. Apertures 45 enable a vacuum to be applied to the dies 38 to vacuum form the bubbles. The bubble areas 25 of the plastic sheet 22 in which the thickness is profiled are, of course, positioned above each of the bubble dies 38 so that the bubbles will be formed from these profiled areas.

The sheet, while it is in a liquid or semi-liquid form (with a temperature around 110–120° C.), is drawn down into the bubble die 38 by the suction from a vacuum source (not shown) applied to the mold apertures 45. This molding operation forms the bubble layer. Because the bubbles are formed from the areas 25 in which the thickness of the sheet is profiled, the bubbles which are produced have a substantially more uniform wall thickness than bubbles produced from conventional plastic sheets.

Figure 9B:
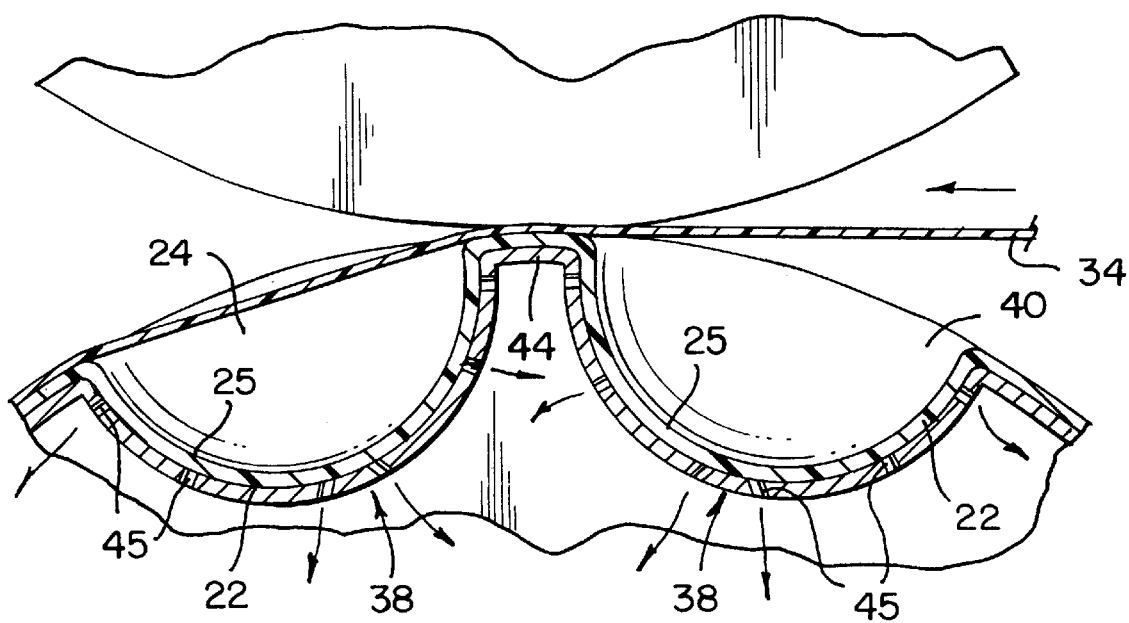
FIG. 9B is a side sectional view similar to FIG. 9A showing how the base layer may be bonded to the bubble layer to form a bubble sheet.

After the bubble layer has been formed, before it is released from the mold, it is joined to a plastic base layer 34 to form the bubble sheet which comprises a multiplicity of air cells 24 spaced by flat seal sections (FIG. 9B). Preferably, the bubble layer is fused to the base layer 34 while both of them are still in a semi-liquid form (i.e. at a temperature between about 105–115° C.).

In accordance with a further embodiment of the invention, bubbles of more uniform wall thickness can be formed from plastic sheet material of uniform thickness as opposed to the plastic sheet 22 in which a multiplicity of profiled bubble regions are provided. This is done by selectively applying a vacuum to the apertures 45 in each of the circular rings, A, B, C, D and E (shown by dashed lines in FIG. 7). In this embodiment, suction is first applied to the apertures close to the peripheral base portion or opening of the bubble, i.e. Ring A, and then sequentially to the remaining rings of apertures. In this fashion, the plastic sheet is drawn initially at the peripheral base portion or opening of the bubble and then inwardly in stages toward the center or bottom of the bubble-shaped molding surface to minimize stretching.

The number and size of the apertures on each of the rings, A, B, C, D, E and F, is dependent on a number of variables such as the size of the bubble, the degree of liquidity of the sheet 22 during the vacuum forming process, speed of production, and the type of raw material being used. These variables may change from time to time and place to place and the optimum combination should be determined experimentally for each manufacturing facility.

If desired, the vacuum pressure also can be varied to minimize thickness variations in the bubble wall. For example, the pressure applied at the base of the bubble (Ring A) may be greater than the pressure at the apertures in Ring B and so forth, reaching a minimum at the apertures near the bubble apex (i.e. the bottom of the die). This variation in pressure may be used alone or in conjunction with the sequential vacuum forming technique described above.

The present invention has been shown and described in what are considered to be the most practical and preferred embodiments. It is anticipated, however, that departures can be made therefrom, and that obvious modifications will be implemented by persons skilled in the art.

Figure 10:
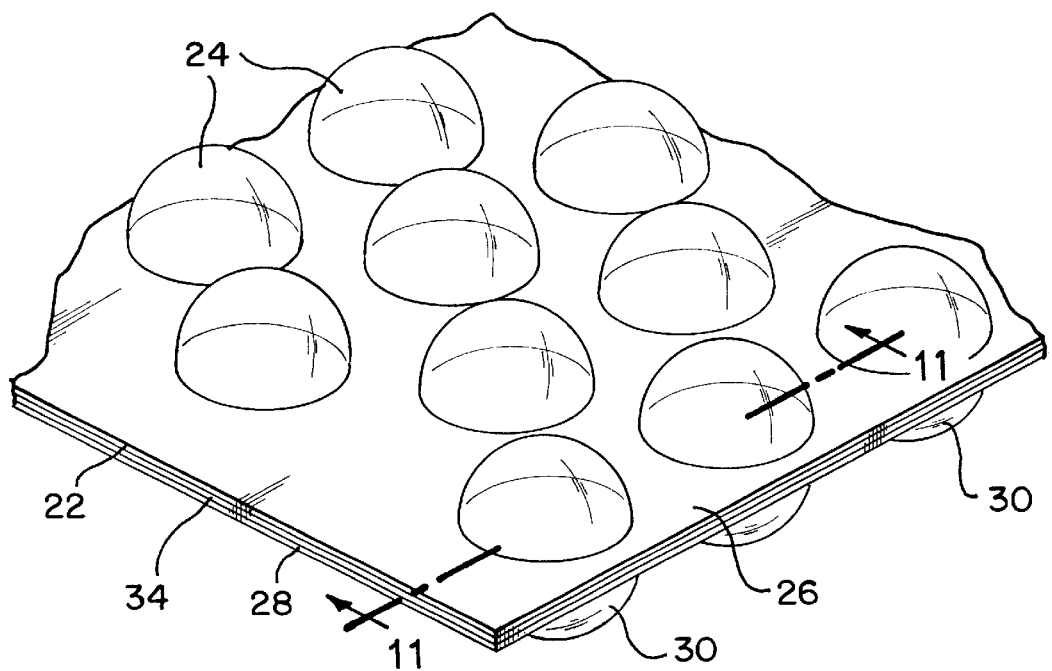
FIG. 10 is a perspective view of a double-side bubble sheet in accordance with another aspect of the invention.
Figure 11:
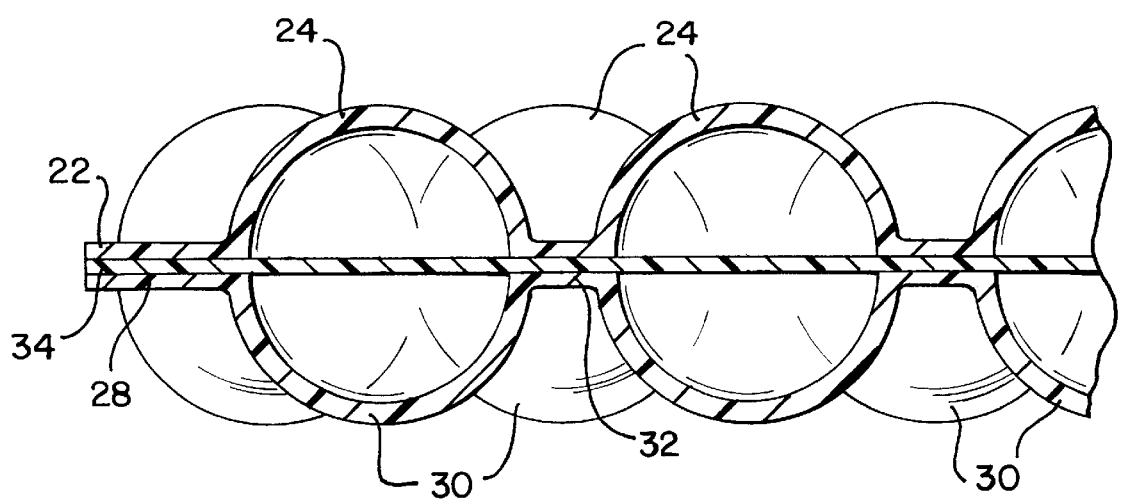
FIG. 11 is a sectional view along the line 11—11 of FIG. 10.

In the manufacture of conventional air cell dunnage, a single sided bubble sheet 12 (as shown in FIGS. 1–3) is wrapped around the object to be protected. Very often, it is desirable to provide two or more layers of dunnage to increase the shock protection in case some of the bubbles are ruptured. In a representative example, if the average wall thickness of the bubble is to be 30 µm the starting sheet should have a thickness of approximately 60 µm. The base layer (which forms part of the bubble and therefore must protect against rupture) should also be 30 µm thick. This means that each bubble sheet requires two sheets which total 90 µm in thickness. If a double wrapping is desired, the material required is twice that amount or 180 µm. According to a still further feature of the invention, a substantial savings in plastic can be achieved if a double-sided bubble sheet is formed as shown in FIGS. 10 and 11. In this case, two separate bubble layers, 22 and 28 containing bubbles 24 and 30, respectively, are welded to opposite sides of a base layer 34. Because two bubble layers are provided, the protection is the same as the protection provided for a double wrap as shown in FIG. 1, but the amount of material is less. For example, if only a single base layer is needed, the savings in the above example amounts to 30 µm or 16.67%, i.e. 30 (the saving by using a single base layer)÷180 (the amount of film required for two separate bubble sheets).

Moreover, since the flat base layer 34 of the bubble sheet (FIGS. 10 and 11), functions primarily as a barrier and is not subject to pressure from the wrapped item to the same degree as the flat base layer of the bubble sheet 12 in FIG. 1, the thickness of the base layer 34 in the case of a double-sided bubble sheet can be less than 15 µm. In this case, the savings in material would be about 25%.

Instead of fusing two bubble layers to opposite sides of a base layer, the same effect can be achieved by fusing two bubble layers to separate relatively thin base layers and then fusing the base layers together. For example, if the thickness of a standard base layer is 30 µm, two bubble layers could be fused to separate base layers, each 15 µm thick or less. The two base layers could then be adhered together thermally or by means of a suitable adhesive to achieve the desired result of two bubble layers in which the amount of plastic is reduced as compared to a double wrapping of conventional bubble sheet.

The double sided bubble sheet of FIG. 10 is advantageous in two respects. First, only a single wrapping of an object is required to provide two layers of air cells as protection. Secondly, as explained above, the double sided bubble sheet requires substantially less plastic material than two layers of a single sided bubble sheet. The double sided bubble sheet is a more efficient "filler" for packaging which requires a bubble sheet material to fill empty space since less material is required than in the prior art.

The double sided bubble sheet in accordance with this aspect of the invention can be made from conventional bubble layers (in which the thickness of the bubbles is not uniform) or it can be made from bubble sheet manufactured as explained above in which the thickness of the wall is uniform or approximately uniform.

In the manufacture of double sided bubble sheets, a pair of large rollers each containing a multiplicity of hemispherical bubble dies are spaced apart a nominal distance so that the plastic sheets being vacuum formed and a base layer can be pinched together as they pass between monitor rollers. During the fabrication process, the rollers rotate in opposite directions to simultaneously guide the respective webs to the defined space while the bubble layers are heated to a softening temperature. As the softened bubble layers contact the rollers, the bubbles are vacuum formed. The bubble layers are advanced through the pinched areas while a web of base layer is guided between them to compress the softened bubble layers against the base layer thereby forming an air tight weld with bubble elements on opposite sides of the base layer.

What is claimed is:

1. A method of manufacturing air cell dunnage for selectively profiling the bubble thickness of said dunnage, comprising the steps of
    preparing a plastic sheet having areas of variable thickness,
    vacuum forming bubbles from said areas of variable thickness to form a bubble layer, and
    fusing said bubble layer to a base layer to form a bubble sheet,
    wherein thicknesses of said areas are selected so that, subsequent to any deformation of said plastic resulting from said vacuum forming, said bubbles generally have a desired thickness profile.

2. A method for forming air cell dunnage according to claim 1, wherein the thickness of said areas is profiled so that the center of each area is thicker than the periphery of the area.

3. A method of manufacturing air cell dunnage according to claim 1, wherein the thickness profiles of said areas are selected so that the bubbles formed by vacuum forming from said areas will have walls of approximately uniform thickness.

4. A method of manufacturing air cell dunnage, comprising the steps of:
    (a) extruding a plastic sheet through a die having a non-uniform opening;
    (b) periodically covering preselected portions of said non-uniform opening as said plastic sheet is extruded therethrough to thereby extrude a plastic film having bubble areas which vary in thickness longitudinally and from side to side;
    (c) drawing said plastic film against a mold surface having a plurality of bubble dies to form a bubble layer; and
    (d) joining said bubble layer to a plastic base layer to form air cell dunnage containing a plurality of air cells.

5. The method of manufacture recited in claim 4, further comprising the steps of extruding a second plastic film having bubble areas which vary in thickness longitudinally and from side to side, drawing said second plastic film against a mold surface having a plurality of bubble dies to form a second bubble layer; and joining said second bubble layer to said plastic base layer on the side of said base layer opposite to said first bubble layer.

6. The method of manufacture recited in claim 5, wherein step (d) comprises fusing said first and second bubble layers to said base layer to entrap air between said bubble layers and said base layer.

7. A method of manufacturing air cell dunnage according to claim 4, wherein the regions which vary in thickness longitudinally and from side to side are placed in respective bubble dies of said mold surface so that the air bubbles are formed from said regions.

8. A method of manufacturing air cell dunnage according to claim 4, wherein the step of periodically covering is provided by moving at least one shaping bar to cover a portion of a non-uniform opening of the die as the sheet is extruded from the die.

9. A method of manufacturing air cell dunnage according to claim 8, wherein a plurality of movable shaping bars are provided.

10. A method of manufacturing air cell dunnage according to claim 4, wherein said non-uniform opening includes a plurality of similarly shaped portions of predetermined shape in which the centers are thicker than the sides.

11. A method of manufacturing air cell dunnage according to claim 10, wherein the step of periodically covering preselected portions is achieved by moving shaping bars toward and away from said plastic sheet as it is extruded to form bubble areas which vary in thickness longitudinally with the center of each bubble area being thicker than it edges.

12. A method of manufacturing air cell dunnage, comprising the steps of extruding a plastic sheet, a placing said sheet in contact with the female dies of a vacuum forming mold, and
    selectively applying suction to said female dies to draw the plastic sheet into the female dies in such a way that the stretching of the sheet at the base of each die is greater than the stretching of the sheet at the bottom of the die.

13. A method of manufacturing air cell dunnage according to claim 12, wherein said femele dies include rows of apertures and the suction is applied to said rows sequentially from the base to the bottom of the die.

14. A method of manufacturing air cell dunnage according to claim 12, wherein said female dies include rows of apertures and the suction applied to said rows is varied with the greatest suction applied at the base of the die and the least suction applied at the bottom of the die.

15. A method of manufacturing air cell dunnage, comprising the steps of:
    (a) providing a mold having a mold surface including a plurality of hemispherically shaped concave areas and a plurality of flat regions interposed between said concave areas of said mold surface, each of said hemispherically shaped concave areas defining a base and a bottom, and including apertures communicating with a vacuum source;
    (b) placing a plastic film against said hemispherically shaped concave areas and said flat regions of said mold surface;
    (c) selectively applying a vacuum to said apertures in each of said hemispherically shaped concave areas, initially to apertures disposed proximal to the bases of said hemispherically shaped concave areas, and sequentially progressing to apertures disposed proximal to the bottoms of said hemispherically shaped concave areas, to thereby draw said plastic film initially from said bases to said bottoms of said hemispherically shaped concave areas; and (d) joining said drawn plastic film before it is released from the mold to a plastic base layer to form air cell dunnage containing a plurality of air cells.

16. The method of manufacture recited in claim 15, further comprising the steps of forming a second drawn plastic film in accordance with steps (a)–(c), and joining said second drawn plastic film before it is released from the mold to said base layer on the side of said base layer opposite to said first drawn plastic film.

17. The method of manufacture recited in claim 16, wherein step (d) comprises fusing said first and second drawn plastic films to said base layer to entrap air between said plastic films and said base layer.

18. A method of manufacturing air cell dunnage, comprising the steps of:

(a) providing a mold having a mold surface including a plurality of hemispherically shaped concave areas and flat regions interposed between said concave areas of said mold surface, each of said hemispherically shaped concave areas defining a base and a bottom, and including apertures communicating with a vacuum source;

(b) placing a plastic film against said hemispherically shaped concave areas and said flat mold surface;

(c) selectively applying vacuum to said apertures in each of said hemispherically shaped concave areas at different suction pressures, with the suction pressures ranging from a maximum suction pressure value at the apertures disposed proximal to the bases of said hemispherically shaped concave areas, to a minimal suction pressure at the apertures disposed proximal to the bottoms of said hemispherically shaped concave areas, to thereby evenly draw said plastic film against said concave areas and flat regions interposed between said concave areas of said mold surface; and (d) joining said drawn plastic film to a plastic base layer to form air cell dunnage containing a plurality of air cells.

19. The method of manufacture recited in claim 18, further comprising the steps of forming a second drawn plastic film in accordance with steps (a)–(c), and joining said second drawn plastic film to said base layer on the side of said base sheet opposite to said first drawn plastic film.

20. The method of manufacture recited in claim 19, wherein step (d) comprises fusing said first and second drawn plastic films to said base layer to entrap air between said plastic films and said base sheet.

* * * * *